United States Patent [19]

Kirwan

[11] 4,151,900
[45] May 1, 1979

[54] BRAKE ASSEMBLY FOR A ROTATABLE SHAFT

[75] Inventor: Gary R. Kirwan, West Caldwell, N.J.

[73] Assignee: Union Carbide Corporation, New York, N.Y.

[21] Appl. No.: 856,118

[22] Filed: Nov. 30, 1977

[51] Int. Cl.$^2$ .......................................... B60T 13/04
[52] U.S. Cl. .................................. 188/174; 188/195; 192/89 W; 242/75.46; 242/156
[58] Field of Search ............... 188/83, 195, 174, 176; 242/75.46, 156, 156.2; 192/89 W; 308/204

[56] References Cited

U.S. PATENT DOCUMENTS

| | | | |
|---|---|---|---|
| 993,500 | 5/1911 | Robeson | 238/89 |
| 1,270,279 | 6/1918 | Ferres | 242/75.46 |
| 2,554,548 | 5/1951 | Albagnac | 188/251 R |
| 2,877,963 | 3/1969 | Heyden | 242/156 |
| 3,517,915 | 6/1970 | Bovagne et al. | 308/204 |
| 3,540,675 | 11/1970 | Goldsworthy | 242/156.2 |
| 3,575,267 | 4/1971 | Lauer, Jr. | 242/156 X |

Primary Examiner—George E. A. Halvosa
Attorney, Agent, or Firm—Eugene Lieberstein

[57] ABSTRACT

A brake assembly for maintaining uniform tension in plastic sheet material being unwound from a supply roll supported on a rotatable shaft. The brake assembly includes a pair of rollers which rotatably support the shaft. One roller is vertically displaceable relative to the other for controlling the movement of a linkage connected to a brake shoe in contact with the shaft. The surface area of brake lining in contact with the shaft is reduced in a proportion relative to the depletion of material from the supply roll.

8 Claims, 7 Drawing Figures

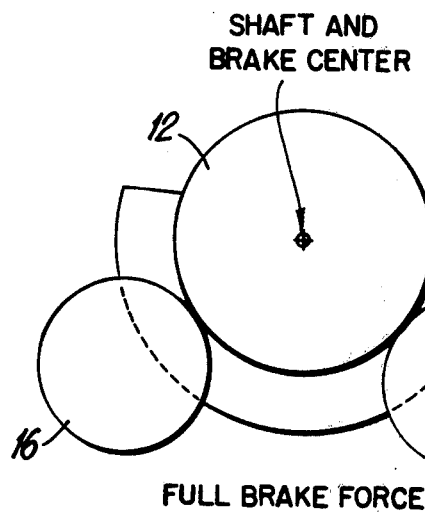
FULL BRAKE FORCE
FIG. 4
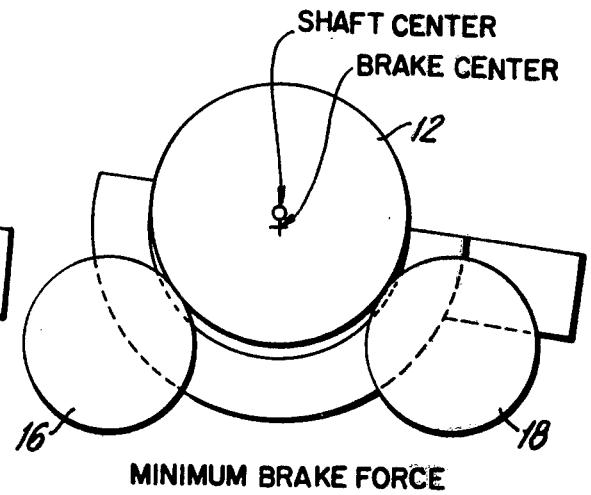
MINIMUM BRAKE FORCE
FIG. 5
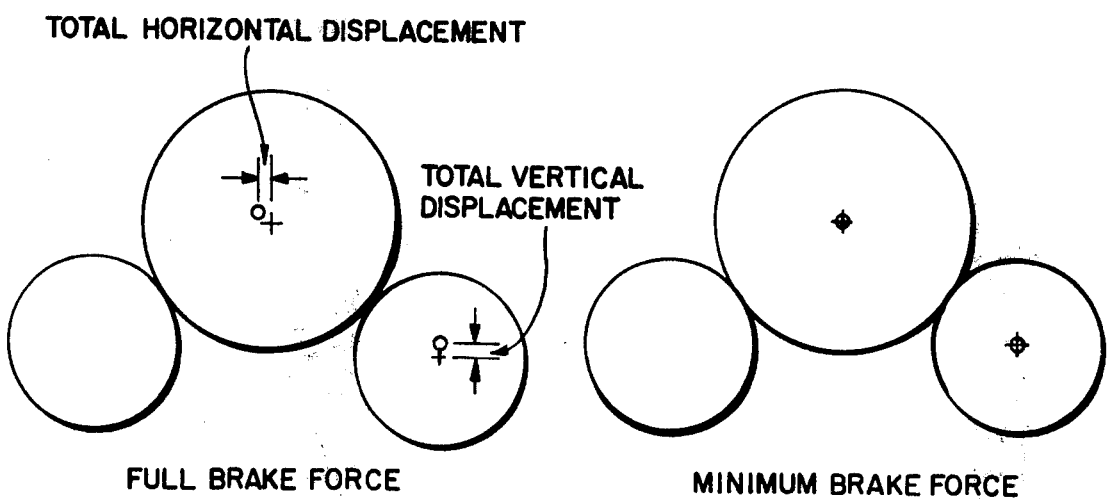
FULL BRAKE FORCE
FIG. 6
MINIMUM BRAKE FORCE
FIG. 7

BRAKE ASSEMBLY FOR A ROTATABLE SHAFT

This invention relates to a brake assembly for automatically maintaining uniform tension in sheet material being fed from a supply roll and more particularly to a brake assembly which applies a self-adjusting braking force to a rotating shaft supporting the supply roll with the braking force being proportional to the weight of the supply roll.

The unwinding of sheet material, such as plastic film, is generally controlled by imposing a drag either directly upon the roll of material or upon a rotatable shaft on which the supply roll is fixedly mounted. The braking force is necessary to prevent overrunning of the roll in response to a decrease in the unwinding force on the sheet material. A constant drag on the supply roll may be accomplished simply by placing a weighted material in intimate contact with the rotating roll. A constant drag does not however compensate for changes in the tension of the unwinding material as the weight of the supply roll changes in response to the removal of material. When the supply roll is fully loaded and is at its heaviest weight the turning moment of the roll is substantially greater than when the supply roll is substantially empty. If the braking force is established to match the tension developed with a full roll excessive braking will be applied as the roll unwinds. Ideally, the braking force should vary with payout to provide a constant tension in the material.

There are many conventional braking mechanisms which automatically impose a braking force upon a rotating shaft in response to the weight of the roll supported by the shaft. The braking force imposed by such conventional mechanisms is applied continuously and uniformly over the entire surface area of the brake pad. This results in a substantial generation of heat which places restrictions on the selection of brake lining material. Moreover, the heat build up will accumulate and substantially increase the operating temperature of the brake assembly thereby decreasing the life expectancy of the brake and potentially causing an operational safety hazard particularly in situations where the brake assembly has to be physically touched or is otherwise exposed to the operator during operation of the material feed system such as when changing supply rolls. Therefore, it is desirable to have a brake apparatus which will not develop excessive heat yet will supply a braking force sufficient to maintain constant tension.

Other advantages of the present invention will become apparent from the following detailed specification of the preferred embodiment of the present invention when read in conjunction with the accompanying drawings of which:

FIG. 4 is a schematic illustration of the braking operation of the present invention with fully applied braking force upon the shaft;

FIG. 5 is a schematic illustration of the braking operation of the present invention with the least braking force applied to the shaft;

FIG. 6 is a schematic illustration of the relationship between the shaft and the brake assembly support rollers with the supply roll in a fully wound condition; and FIG. 7 is a schematic illustration similar to FIG. 6 between the shaft and the brake assembly support rollers with the supply roll in a substantially empty condition.

In accordance with the teachings of the present invention the surface area of the brake in physical contact with the rotating shaft is reduced in a proportion relative to the depletion of feed material from the supply roll. The reduced brake surface area generates less heat and accordingly reduces the operating temperature as the supply roll is being depleted. The braking force on the shaft is gradually shifted from a substantially uniform application to a substantially nonuniform application.

Figure 1:
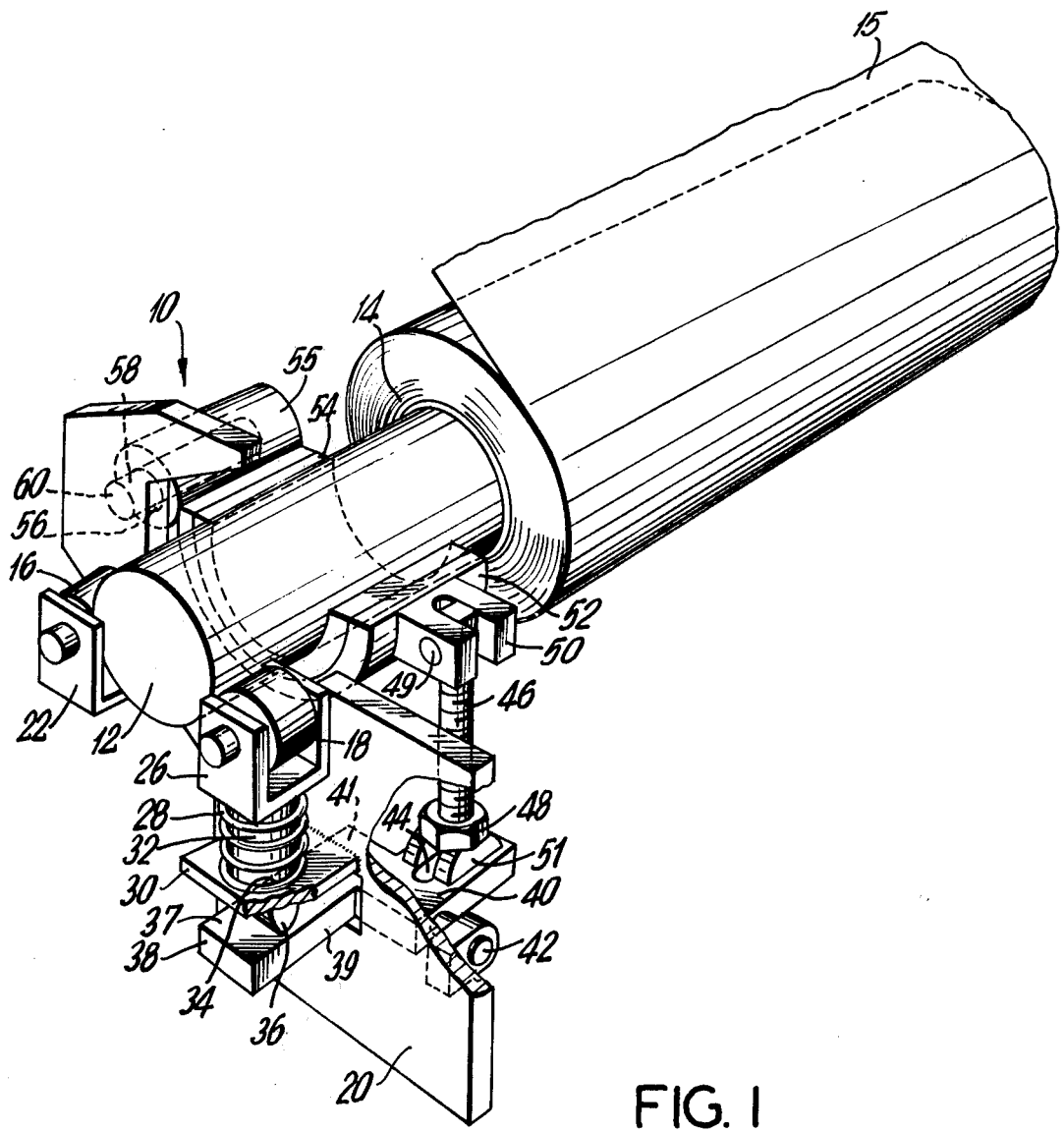
FIG. 1 is a pictorial isometric of the brake assembly of the present invention in an operating relationship relative to a rotating shaft.
Figure 2:
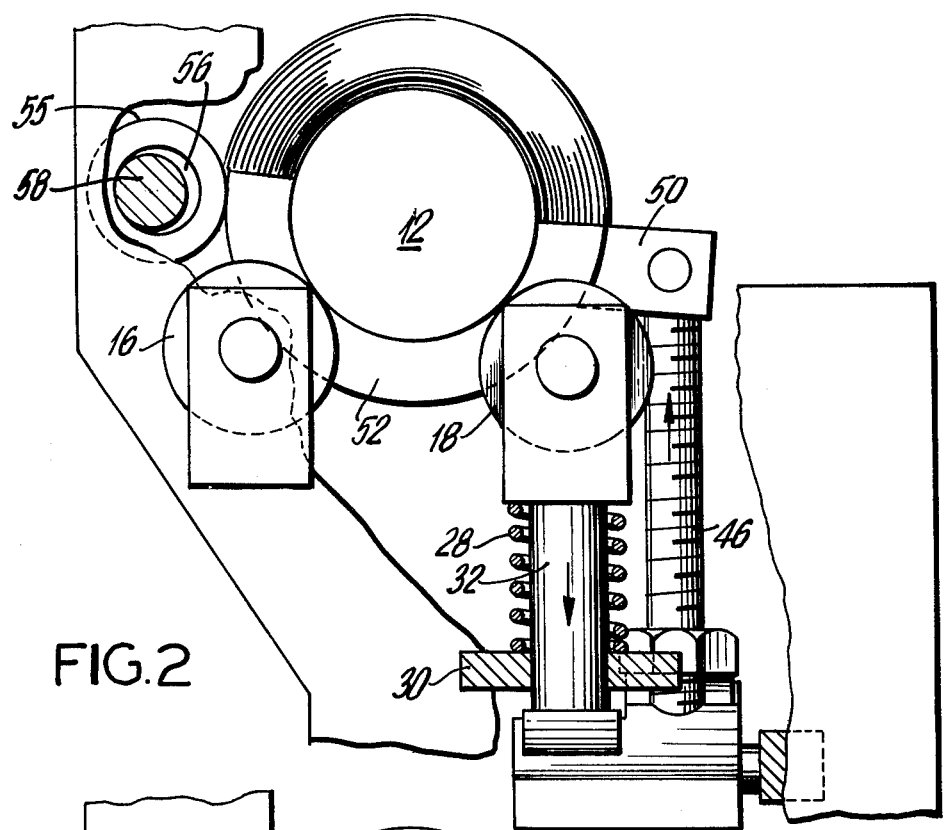
FIG. 2 is a schematic end elevation of the brake assembly of FIG. 1 with the supply roll shown in a fully wound condition.
Figure 3:
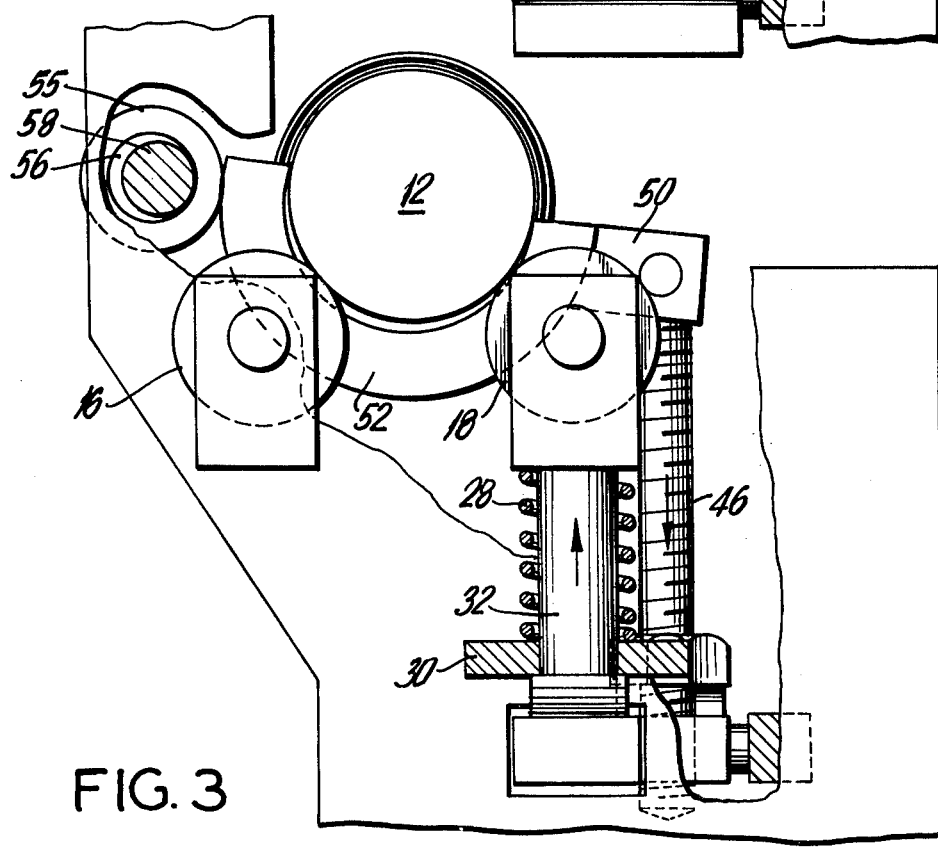
FIG. 3 is a schematic end elevation of the brake assembly similar to FIG. 2 with the supply roll shown in a substantially empty condition.

Referring now in particular to FIG. 1 in which the brake assembly 10 of the present invention is shown in perspective and in an operating relationship relative to a rotating shaft 12. The rotating shaft 12 carries a fully wound supply roll 14 of feed material 15 for common rotation about its longitudinal axis. The rotating shaft 12 is supported at one end in the brake assembly 10 primarily by a pair of support rollers 16 and 18 respectively. The opposite end of the rotating shaft 12 is preferably journaled in a bearing (not shown) although a second duplicate brake assembly may be used. The support rollers 16 and 18 of the brake assembly are connected to a common frame 20 forming the housing for the brake assembly 10. The frame 20 is in turn connected to a main frame (not shown) which rests on level ground. Support roller 16 is rotatably trunnioned on yoke 22 which is fixedly attached to the frame 20. The other support roller 18 is rotatably trunnioned on yoke 26 which is spring mounted upon a compression spring 28 seated over a support block 30 connected to the common frame 20. A connecting rod 32 attached to the yoke 26 extends through an aperture 34 in the support block 30 which forms a guide bearing for movement of the yoke 26 in a vertical direction. The connecting rod 32 has a free end 36 which is preferably of a rounded geometry. The rounded end 36 of the connecting rod 32 rests upon one end 37 of a lever arm 38. The lever arm 38 can be of and desired shape but is preferably that of a flat member having two parallel sides 39 and 40 bridged by a third side 41 lying in approximately the center of the lever arm 38 perpendicular to the parallel sides 39 and 40. The lever arm 38 is pivotally connected through a pivot pin 42 to the frame 20. The side 40 of the pivoted lever arm has a bifurcated opening 44 through which extends an elongated brake rod 46. The brake rod 46 is threaded at one end to receive an adjustable nut 48 and is pivotally connected at its opposite end, by pivot pin 49, to a clevis 50 which extends from the brake shoe 52. The lever arm 38 has a raised curved surface 51 located adjacent the opening 44 on side 40 which is in biased engagement with the adjustable nut 48.

The brake shoe 52 has a circular open faced brake lining 54 of any desired composition such as, for example, steel impregnated asbestos. The coefficient of friction of the brake lining material should be relatively high and preferably above 0.40. As will be explained in greater detail hereafter the brake lining 54 forms a circular arc which circumscribes an angle of preferably greater than 180° but not greater than about 190°. The diameter of the brake lining 54 should be equal to the diameter of the rotating shaft 12. The rotating shaft 12 is composed of steel and does not require a brake drum. The rotating shaft 12 is mounted in the brake assembly 10 for rotatable engagement with the support rollers 16 and 18. The brake shoe 52 is maintained in contact with the shaft 12 by a force imposed by the brake rod 46. The magnitude of the force is determined by the position of the lever arm 38 which in turn is controlled by the weight of the supply roll 14. Accordingly, the weight of the supply roll 14 controls the amount of pressure applied by the brake shoe 52 and the degree of contact between the brake lining 54 and the shaft 12. This will be further elaborated upon in greater detail in connection with FIGS. 2–7.

The brake shoe 52 is supported on opposite sides relative to its longitudinal axis. One such side is pivotally connected through the clevis 50 to the brake rod 46 whereas the opposite side is connected to a rear stud 55 having a hollow slot 56 which lies parallel to the longitudinal axis of the brake shoe 52. The slot 56 has an elliptical cross-sectional geometry with the major axis of the ellipse lying in a horizontal plane transverse to the longitudinal axis of the brake shoe 52. A cylindrical support body 58 lies within the slot 56 with one of its ends 60 fastened to the frame 20. The support body 58 has a diameter smaller than the major dimension of the elliptical slot 56 so as to accommodate a lateral shifting of the brake shoe 52 in reaction to the vertical displacement between the rollers 16 and 18 as will be explained hereafter in connection with FIGS. 2–7.

OPERATION

Referring now to FIGS. 2–7 in conjunction with FIG. 1, the brake assembly 10 is initially adjusted for a desired tension in the material 15 by raising or lowering the level of the adjustment nut 48 on the brake rod 46. The supply roll 14 may be an order of magnitude heavier when fully loaded than when empty. Accordingly, when the supply roll 14 is fully loaded the shaft 12 applies maximum force upon the spring loaded roller 18 forcing it down to a position of maximum vertical displacement relative to the stationary roller 16. In this position, it is preferred that the longitudinal axis of the shaft 12 lie substantially congruent with the longitudinal axis of the circular brake shoe 52. This will result in maximum braking force with essentially all of the brake lining 54 in contact with the shaft 12. The brake lining 54 is held in frictional contact against the rotating shaft 12 by the upward pressure applied from the brake rod 46.

As material 15 is unwound from the supply roll 14 the weight of the shaft 12 decreases. This decrease in weight is sensed by the spring 28 which operates in response to the reduction in pressure to gradually raise the yoke 26, connecting rod 32 and movable support roller 18 respectively. The movement of the connecting rod 32 causes a corresponding rotation of the lever arm 38 which lowers the brake rod 46 thereby decreasing the braking force applied by the brake rod 46 on the brake shoe 52. The upper movement of the support roller 18 in combination with the downward movement of the brake rod 46 causes the brake shoe 52 to shift its position relative to the shaft 12. The support roller 18 moves from a vertical position below the level of the stationary roller 16 to a vertical position substantially aligned with the stationary roller 16. This movement is clearly indicated in FIGS. 6 and 7. The variation in surface area of the brake lining 54 in contact with the shaft 12 is clearly visible from FIGS. 4 and 5. The rear stud 55 accommodates a lateral shifting of the brake shoe 52 in response to the rise in the support roller 18 as evident from FIGS. 2 and 3.

By varying the surface area of the brake lining 54 engaging the shaft 12 the heat build up in the brake lining 54 and shoe 52 is substantially reduced. By moving the brake shoe 52 away from the shaft 14, air is permitted to circulate about the brake lining 54. This increases the cooling capacity of the brake which is believed to be responsible in preventing heat build up in the brake assembly. The braking force is, however, being redistributed as the supply roll 14 decreases in weight to maintain a constant horsepower. The following example demonstrates that the horsepower is held essentially constant:

---

I. HORSE POWER OF SUPPLY ROLL

(1) Web Tension
  measured at 3 lbs./ft.
  Tension across entire web (37" wide)
  (37"/12"/ft) (3 lbs/ft) = 9.25 lbs (2) Web Speed
  Assume constant at 250 FPM (3) Roll Speed
  Circumference $C = \pi D/12$
  26" Diameter Roll
  2.25 Diameter Shaft Roll circumference (full roll) $\quad C_{Ri} = \frac{\pi 26}{12} = 6.8$ ft.

Roll circumference final (empty roll) $\quad C_{RS} = \frac{\pi 3}{12} = .78$ ft Shaft circumference $\quad C_S = \frac{2.25}{12} = .58$ ft.

$$RPM = \frac{\text{Web speed in FPM}}{C_R}$$

$$RPM_i = \frac{250}{6.8} = 36.76$$

$$RPM_f = \frac{250}{.78} = 320.51$$

(4) Shaft Speed
  $V = RPM(C_S)$
  $V_i = 36.76 (.58) = 21.32$ FPM
  $V_f = 320.51 (.58) = 185.89$ FPM (5) Torque on Supply Roll
  Torque = (Force)×(1 Distance to Center)
  $T_i = (9.25) (13/12) = 10.02$ ft - lbs
  $T_f = (9.25) (1.5/12) = 1.15$ ft - lbs (6) Horsepower of Roll Shaft $$HP = \frac{(\text{Torque})(RPM)}{63000} = \frac{(\text{Torque})(V/C_S)}{63000}$$

$$HP_i = \frac{(10.02 \text{ ft-lbs}) \frac{(21.32)}{.58}}{63000} = .00585$$

$$HP_f = \frac{(1.15) \frac{(185.89)}{.58}}{63000} = .00585$$

---

II HORSEPOWER ABSORBED BY BRAKE

(1) Brake Area
  A = Circumference × (length)
  Brake circumference
  $C_B = \pi D$ (% Engaged Brake Area)
  % Engaged Brake Area
  $\%_i = \frac{360° - 170°}{360°} = .514\%$
  $\%_f = \frac{360° - 350°}{360°} = .023\%$
  $C_{Bi} = \pi (2.25) (.514) = 3.63"$ (full load)
  $C_{Bf} = \pi (2.25) (.023) = 1.63"$ (empty load)
  Brake (length) = 2.5"
  $A_i = 3.63 (2.5) = 9.075$ sq. in.

-continued
II HORSEPOWER ABSORBED BY BRAKE $A_f = .163 (2.5) = .408$ sq. in.

(2) Pressure Exerted Against Brake Lining.

$$P = \frac{\text{Brake Force}}{\text{Brake Area}}$$

Brake Force$_i$ = 18 lbs (measured)
Brake Force$_f$ = 2 lbs (measured)
$P_i = 18/9.075 = 1.98$ psi
$P_f = 2/.408 = 4.90$ psi If Brake area were constant
  $P_f = 2/9.075 = .220$ psi (3) Brake HP absorbed $$hp = \frac{\mu A P V}{33000}$$

where $\mu$ = coefficient of friction
A = Brake Area
P = Brake Pressure
V = Shaft velocity $$hp_i = \frac{.45 (9.075)(1.98)(21.32)}{33000} = .0052 \; 89\% \text{ of Roll hp}$$

$$hp_f = \frac{.45 (.408)(4.90)(185.89)}{33000} = .0051 \; 87\% \text{ of Roll hp}$$

IF brake area were constant $$hp_f = \frac{(.45)(9.075)(.220)(185.89)}{33000} = .0050 \; 85\% \text{ of Roll hp}$$

The above example shows that the brake absorbs the horsepower generated by the roll shaft at a constant rate regardless of the brake surface area. However the heat generated is dependent upon surface area. By moving the brake shoe so as to vary the brake lining surface area in contact with the shaft it is apparent that there will be considerably less heat absorbed by the brake assembly.

In the above example essentially all of the brake was held in contact with the shaft at maximum load and only ten percent at minimum load. It should be understood that this substantial variation is given by way of example only and that reduced heating will be obtained with substantially less reduction in brake surface area. The preferred variation is a difference of at least 30 percent.

What is claimed is:

1. A brake assembly for applying a braking force to a rotating shaft with the magnitude of the braking force being proportional to a variable weight supported by the shaft, said brake assembly comprising, in combination;
    a frame;
    a pair of rollers for supporting said shaft, said rollers being laterally separated from one another and mounted upon said frame in rotatable engagement with one end of said shaft;
    means for adjusting the vertical height of one of said rollers relative to the other in response to a change in the weight of said shaft;
    a brake shoe having a circular brake lining;
    means for urging said brake shoe into engagement with said shaft; and
    means responsive to the vertical displacement between said rollers for moving said brake shoe relative to said shaft such that the amount of surface friction area of said brake lining engaging said shaft varies with the weight of said shaft.

2. A brake assembly as defined in claim 1 wherein said circular brake lining circumscribes an arc having an included angle of above at least 180°.

3. A brake assembly as defined in claim 2 wherein each roller is rotatably mounted in a separate yoke member with an axis of rotation disposed in substantial parallel alignment relative to one another and to the longitudinal axis of said shaft.

4. A brake assembly as defined in claim 3 wherein a predetermined first one of said yoke members is movable along a vertical axis for adjusting the vertical height of one roller relative to the other and further comprising a compression spring located between the first yoke member and said frame.

5. A brake assembly as defined in claim 4 wherein said means for moving said brake shoe relative to said shaft comprises;
    a brake rod;
    means for pivotally connecting a first side of said brake shoe to said brake rod;
    means for linking said brake rod to said first yoke member such that said brake rod moves vertically in response to vertical movement of said first yoke member; and
    means for coupling a second side of said brake shoe, opposite said first side, to said frame so as to permit laterally shifting of said brake shoe in response to said vertical displacement between rollers.

6. A brake assembly as defined in claim 5 wherein said brake lining has a coefficient of friction of above at least .40.

7. A brake assembly as defined in claim 4 wherein said brake lining has a coefficient of friction of above at least 0.40.

8. A brake assembly as defined in claim 7 wherein said brake lining is composed of a steel impregnated asbestos composition.

* * * * *